March 6, 1956   F. A. BONOMI   2,737,614
PULSE DIVIDER

Filed March 23, 1953   2 Sheets-Sheet 1

INVENTOR
F. A. BONOMI
BY C. Mattice
ATTORNEY

March 6, 1956  F. A. BONOMI  2,737,614
PULSE DIVIDER

Filed March 23, 1953  2 Sheets-Sheet 2

Z - HOLD

Z - RELEASES ON OPEN CIRCUIT

INVENTOR
F. A. BONOMI
BY
C. Mattice
ATTORNEY

United States Patent Office 2,737,614
Patented Mar. 6, 1956

2,737,614
PULSE DIVIDER

Felix A. Bonomi, St. Albans, N. Y., assignor to Bell Telephone Laboratories, Incorporated, New York, N. Y., a corporation of New York Application March 23, 1953, Serial No. 344,125

3 Claims. (Cl. 317—140)

This invention relates to pulse counting arrangements and has for its object to increase the speed of response by such arrangements.

Counting arrangement employing relays are in general use in telephone systems for counting the pulses generated by subscriber dials. Many of these counting circuits employ pulse dividers to control the relays which perform the actual counting. However, the speed of the pulses which can be counted by such known arrangements is somewhat limited.

In accordance with the present invention a pulse dividing arrangement is provided which is capable of following pulses of much greater speed.

Specifically the invention provides a two-relay pulse dividing circuit in which the relays are operated in low resistance circuits and are held operated in high resistance circuits to render them quickly responsive to the release condition.

A feature of the invention lies in means whereby the two relays, when operated in response to a first pulse, are included in a Wheatstone bridge type of circuit with one of the relays in the diagonal of the bridge. A second pulse reverses the potential across the diagonal causing the instant release of the relay included in the diagonal.

The invention will be more clearly understood from a consideration of the following description read in connection with the drawing in which.

Figure 2:
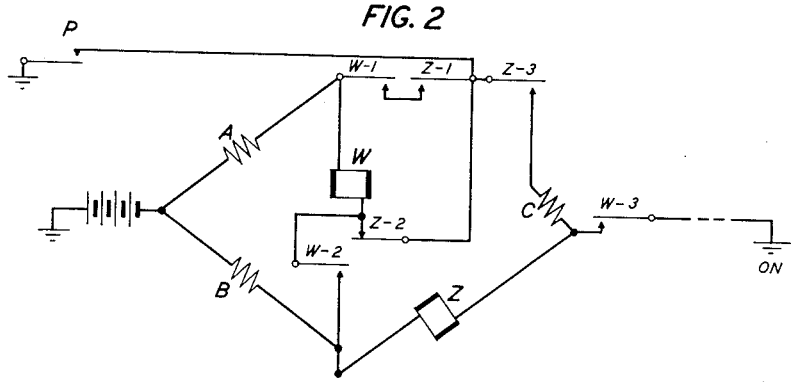
Fig. 2 shows the same circuit as Fig. 1 but illustrating how the circuit may be arranged in the form of a Wheatstone bridge.
Figure 3:
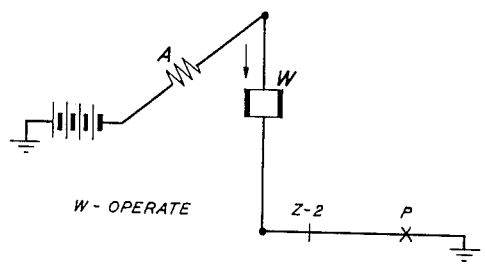
Figs. 3 to 8 show details of the operation of the circuit of Figs. 1 and 2.
Figure 4:
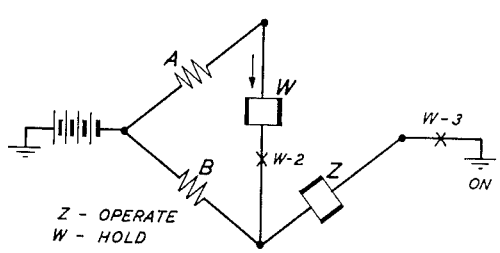
Figure 5:
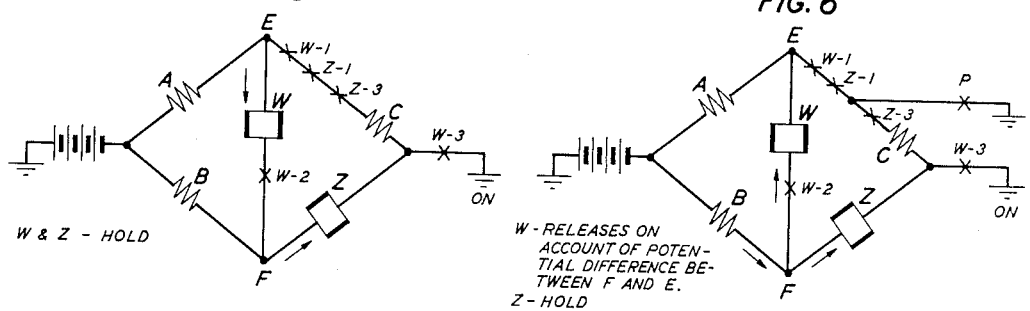
Figure 6:
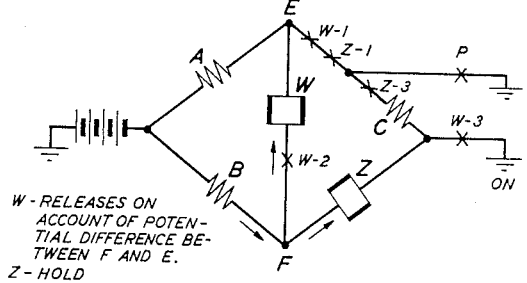
Figure 7:
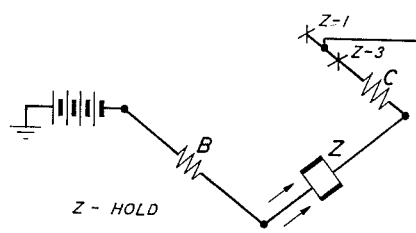
Figure 8:
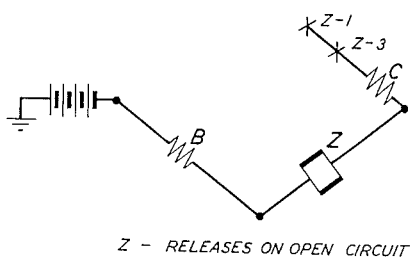
Figure 9:
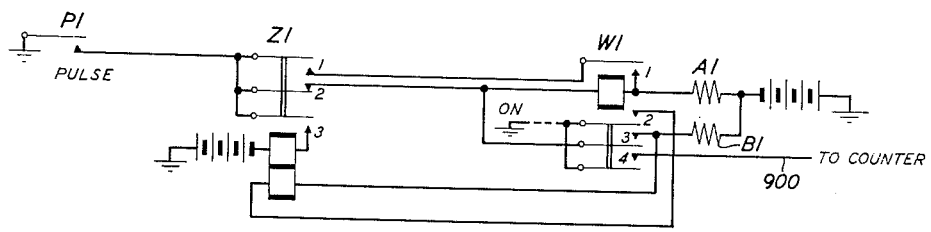
Figure 10:
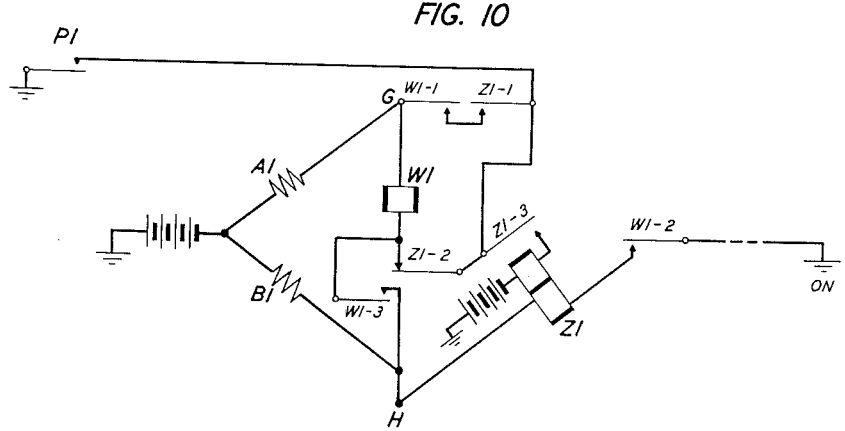

Fig. 3 showing the operating circuit for the primary relay;

Fig. 4 showing the operating circuit for the secondary relay;

Fig. 5 showing the holding circuit for the two relays;

Fig. 6 showing the releasing circuit for the primary relay;

Fig. 7 showing the holding circuit for the secondary relay;

Fig. 8 showing the release of the secondary relay;

Fig. 9 shows a modified form of the invention in which one resistance is omitted and a second winding is provided on the secondary relay; and Fig. 10 shows the circuit of Fig. 9 arranged in a form similar to Fig. 2.

In general the relay contacts have been shown in the conventional manner but in Figs. 3 to 8, in order to simplify the circuits, contact 2 of relay Z, which is normally closed, is shown as a single short line perpendicular to the lines representing the connecting conductors, while the contacts of relay Z and relay W, which are normally open and are closed when the relays are operated, are indicated by an X formed at the junction of the conductors connected thereby.

Referring first to Figs. 1 to 8, when the pulsing contact P closes, which normally occurs on the seizure of the counting circuit, a circuit is closed from ground over contact P, contact 2 of relay Z, winding of relay W through resistance A to battery. This circuit is also shown in Fig. 3. Relay W operates in this circuit closing its contacts 1 to 4. At its contacts 2 and 3, relay W completes a locking circuit for itself from battery through resistance A, winding of relay W, contact 2 of relay W, winding of relay Z, contact 3 of relay W to off-normal ground. The closure of contact 2 of relay W also connects resistance B in parallel with resistance A and the winding of relay W. At this time, ground over the pulsing contact P is connected over contact 2 of relay Z and contact 2 of relay W to one side of the winding of relay Z, while off-normal ground is connected over contact 3 of relay W to the other side of the winding of relay Z and, therefore, relay Z cannot operate in the locking circuit above traced. At its contact 4, relay W connects off-normal ground to conductor 100 to prepare the counter for operation.

When contact P opens in response to the first pulse, ground is disconnected from one side of the winding of relay Z and that relay operates. As shown in Fig. 4, the operating circuit for relay Z extends from battery through resistance A and the winding of relay W, with resistance B connected in parallel therewith, so that relay Z operates in a low resistance circuit while relay W is held in a high resistance circuit.

As soon as relay Z operates, the Wheatstone bridge arrangement shown in Fig. 5 results, in which battery is connected to one end of the bridge and off-normal ground over contact 3 of relay W is connected to the other end of the bridge. The battery arms of the bridge comprise resistances A and B which are of equal value, while the ground arms of the bridge comprise high resistance C and the lower resistance winding of relay Z. The winding of relay W is connected between points E and F in the diagonal of the bridge. The relative values of the resistances of resistance C and of the winding of relay Z are such that the bridge is sufficiently unbalanced to hold relay W operated with current flowing in the direction indicated by the arrow.

When contact P recloses following the first pulse, ground is connected over contact P to a point between the winding of relay W and resistance C, that is, over contact 1 of relay Z and contact 1 of relay W, to point E as shown in Fig. 6. The connection of direct ground to point E reverses the potential across the diagonal of the bridge and thereby across the winding of relay W. This reversed potential, if continued, would reverse the energization of relay W but before the reversed energization can become effective the original energization decays to a point where relay W releases its armatures, disconnecting itself both from the ground supplied by contact P and from the ground supplied through the winding of relay Z. The release of relay W disconnects ground from conductor 100.

With relay W released, relay Z is held operated, as shown in Fig. 7, in a circuit from battery through resistance B, winding of relay Z, resistance C, contact 3 of relay Z to ground over contact P. Since resistance C is now connected in series with the winding of relay Z, the holding current for relay Z is materially less than the operating current.

When contact P is opened for the second time, the holding circuit for relay Z is opened as shown in Fig. 8 and that relay releases on open circuit, restoring the pulse divider to condition to receive additional pulses.

From the foregoing it will be apparent that the current flow through relay W is a maximum when its operating circuit is closed, is progressively reduced by the closure of the parallel branches making up the Wheatstone bridge__ circuit to a holding minimum and is reversed to produce the release condition for the relay. The current flow through relay Z is a maximum when its operating circuit becomes effective, is reduced by the completion of the Wheatstone bridge, is further reduced by the release of relay W and is interrupted to produce the release condition.

Figure 1:
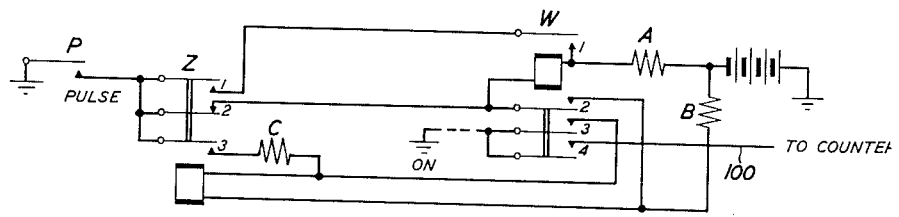
Fig. 1 shows the preferred embodiment of the invention in conventional form.

In the modified form shown in Figs. 9 and 10, the operation of the pulse divider relays is very similar to that described for the arrangement shown in Figs. 1 and 2. When contact P1 closes, a circuit is closed from ground over contact P1, contact 2 of relay Z1, winding of relay W1, resistance A1 to battery. Relay W1 operates in this circuit closing a locking circuit for itself from battery through resistance A1, winding of relay W1, contact 3 of relay W1, lower winding of relay Z1, contact 2 of relay W1 to off-normal ground. Off-normal ground is connected over contact 4 of relay W1 to conductor 900 to prepare the counter for operation. Battery through resistance B1 is connected to one side of the lower winding of relay Z1 but since contact P1 is closed, ground is connected in shunt of this battery over contact 2 of relay Z1 and contact 3 of relay W1, while ground is connected to the other side of the winding of relay Z1 over contact 2 of relay W1 so that relay Z1 cannot operate.

When contact P1 opens in response to the first pulse, relay Z1 operates in a circuit from battery through resistance A1, winding of relay W1 and contact 3 of relay W1 in parallel with battery through resistance B1, lower winding of relay Z1 to ground over contact 2 of relay W1. Relay Z1, in operating, closes a locking circuit for itself from battery through its upper winding, contact 3 of relay Z1, contact 1 of relay Z1, contact 1 of relay W1, winding of relay W1, contact 3 of relay W1, lower winding of relay Z1, contact 2 of relay W1 to off-normal ground. At this time the potential of point G (Fig. 9) is higher than the potential of point H and relay W1 is held operated.

When contact P1 closes at the end of the first pulse, a direct locking circuit for relay Z1 is closed from battery through the upper winding of relay Z1, contact 3 of relay Z1 to ground over contact P1. Ground supplied over contact P1 is connected over contact 1 of relay Z1 and contact 1 of relay W1 to point G reversing the potential across the winding of relay W1. As the original energization decays in response to this potential reversal, a point is reached at which relay W1 releases its armatures, opening its contacts and disconnecting its winding from battery through resistance B1 and ground over contact P1. At this time contact 2 of relay Z1 is open and relay W1 cannot reoperate until after relay Z1 has released. With relay W1 released, ground is disconnected from conductor 900.

When contact P1 again opens, the holding circuit for relay Z1 is opened and that relay releases restoring the pulse divider to condition to respond to additional pulses.

As a consequence of these circuit arrangements, the present pulse divider is very rapid in its operation and release, and will operate on pulse speeds far exceeding those in general use. One practical embodiment of the invention has operated satisfactorily on pulse speeds in excess of 85 pulses per second.

What is claimed is:

1. A pulse dividing circuit comprising a pulsing contact, a primary relay having a winding and a plurality of front contacts, a secondary relay having a winding, a single back contact and a plurality of front contacts, first, second and third resistances and a current source, said third resistance having a higher resistance than said first and second resistances, a first circuit closed over the back contact of said secondary relay in response to the first closure of said pulsing contact for energizing the winding of said primary relay from said current source through said first resistance, a second circuit prepared by the closing of the contacts of said primary relay connecting said second resistance in parallel with said primary relay winding and said first resistance and in series with the winding of said secondary relay, a shunt circuit around the winding of said secondary relay closed by said pulsing contact, the first opening of said pulsing contact opening said shunt circuit to render said second circuit effective to operate said secondary relay, the operation of said secondary relay opening said back contact to open said first circuit and closing said front contacts to prepare a holding circuit for said secondary relay through said second and third resistances, a third circuit closed over front contacts of said primary and secondary relays from said current source through said first resistance in parallel with said second resistance and the winding of said primary relay to reverse the direction of current flow through said primary relay, the second closure of said pulsing contact completing said holding circuit and said third circuit to cause said primary relay to release and open its contacts to open said second and third circuits, the second opening of said pulsing contact opening said holding circuit to cause said secondary relay to release.

2. A pulse dividing circuit comprising a pulsing contact, a primary relay having a winding and a plurality of front contacts, a secondary relay having a winding, a single back contact and a plurality of front contacts, first, second and third resistances and a current source, said third resistance having a higher resistance than said first and second resistances, a first circuit closed over the back contact of said secondary relay in response to the first closure of said pulsing contact for energizing the winding of said primary relay from said current source through said first resistance, a second circuit prepared by the closing of the contacts of said primary relay connecting said second resistance in parallel with said primary relay winding and said first resistance and in series with the winding of said secondary relay, a shunt circuit around the winding of said secondary relay closed by said pulsing contact, the first opening of said pulsing contact opening said shunt circuit to render said second circuit effective to operate said secondary relay, the operation of said secondary relay to close its front contacts completing a Wheatstone bridge having said first, second and third resistances and the winding of said secondary relay for the four arms of said bridge with said primary relay connected across the diagonal of the bridge, the higher resistance of said third resistance causing said bridge to be unbalanced to hold said primary relay operated, the second closure of said pulsing contact short-circuiting the high resistance arm of said bridge to reverse the unbalance of said bridge and release said primary relay, the release of said primary relay opening said bridge circuit, the second opening of said pulsing contact releasing said secondary relay.

3. A pulse dividing circuit comprising a pulsing contact, a primary relay having a winding and a plurality of front contacts, a secondary relay having a winding, a single back contact and a plurality of front contacts, first, second and third resistances and a current source, said third resistance having a higher resistance than said first and second resistances, a first circuit closed over the back contact of said secondary relay in response to the first closure of said pulsing contact for energizing the winding of said primary relay from said current source through said first resistance, a second circuit prepared by the closing of the contacts of said primary relay connecting said second resistance in parallel with said primary relay winding and said first resistance and in series with the winding of said secondary relay, a shunt circuit around the winding of said secondary relay closed by said pulsing contact, the first opening of said pulsing contact opening said shunt circuit to render said second circuit effective to operate said secondary relay, the operation of said secondary relay to close its front contacts completing a Wheatstone bridge having said first, second and third resistances and the winding of said secondary relay for the four arms of said bridge with said primary relay connected across the diagonal of the bridge, the higher resistance of said third resistance causing said bridge to be unbalanced to hold said primary relay operated, the second closure of said pulsing contact short-circuiting the high resistance arm of said bridge to complete a holding circuit for said secondary relay and to reverse the direction of current flow across the diagonal of said bridge and thereby through the winding of said primary relay, said primary relay opening its front contacts in response to said current reversal, the opening of said primary relay contacts opening said bridge circuit, the second opening of said pulsing contact releasing said secondary relay.

References Cited in the file of this patent

UNITED STATES PATENTS

| | | |
|---|---|---|
| 1,142,852 | Simon | June 15, 1915 |
| 1,751,263 | Cesareo | Mar. 18, 1930 |
| 2,067,151 | Dicke | Jan. 5, 1937 |
| 2,593,578 | Liberg | Apr. 22, 1952 |
| 2,676,313 | Dehn | Apr. 20, 1954 |